US010391583B2

(12) United States Patent
Moratalla Martínez et al.

(10) Patent No.: US 10,391,583 B2
(45) Date of Patent: Aug. 27, 2019

(54) INDUCTION WELDING PROCESS FOR VARIABLE DIAMETER PIPES AND DEVICE FOR CARRYING OUT SAID PROCESS

(71) Applicant: GH Electrotermia, S.A., Valencia (ES)

(72) Inventors: Pedro Moratalla Martínez, Valencia (ES); Juan Carlos Rodríguez Lara, Valencia (ES); César Cases Sanchís, Valencia (ES); Manuel Durán Sánchez, Valencia (ES); José Miguel Magraner Cáceres, Valencia (ES)

(73) Assignee: GH Electrotermia, S.A., Valencia (ES)

( * ) Notice: Subject to any disclaimer, the term of this patent is extended or adjusted under 35 U.S.C. 154(b) by 117 days.

(21) Appl. No.: 15/625,259

(22) Filed: Jun. 16, 2017

(65) Prior Publication Data

US 2017/0361393 A1    Dec. 21, 2017

(30) Foreign Application Priority Data

Jun. 17, 2016    (ES) .................................. 201630825

(51) Int. Cl.
*H05B 6/40* (2006.01)
*B23K 13/02* (2006.01)
*B23K 13/00* (2006.01)
*H05B 6/10* (2006.01)

(52) U.S. Cl.
CPC .......... *B23K 13/025* (2013.01); *H05B 6/101* (2013.01); *H05B 6/40* (2013.01)

(58) Field of Classification Search
CPC .......... B23K 13/025; H05B 6/40; H05B 6/42
USPC ......... 219/617, 612, 613, 614, 610, 67, 632, 219/651, 660, 659, 670, 671, 673, 674; 228/147, 196, 146, 148, 222; 72/52, 181, 72/368

See application file for complete search history.

(56) References Cited

U.S. PATENT DOCUMENTS

| | | | | | |
|---|---|---|---|---|---|
| 3,414,697 | A | * | 12/1968 | Rudd | ..................... B23K 13/02 219/614 |
| 3,689,725 | A | * | 9/1972 | Hammer | .............. B23K 13/025 219/612 |
| 2008/0308550 | A1 | * | 12/2008 | Nemkov | .............. B23K 13/025 219/607 |
| 2014/0339219 | A1 | | 11/2014 | Ignatowski et al. | |

FOREIGN PATENT DOCUMENTS

| | | |
|---|---|---|
| DE | 3913897 A1 | 10/1990 |
| ES | 0479528 A1 | 1/1980 |
| JP | 2001199790 A | 7/2001 |

* cited by examiner

*Primary Examiner* — Quang T Van
(74) *Attorney, Agent, or Firm* — The Webb Law Firm

(57) ABSTRACT

Induction welding device for variable diameter pipes includes three inductors configured in the shape of a cam, placed in symmetry in relation to the axial axis of the pipe to be welded, an oscillator connected to each inductor, a mechanical system connected to each inductor, designed to force each inductor to make contact with the pipe by the corresponding degree in relation to the diameter of the pipe at each position, so that the position of the inductors in relation to the pipe changes radially as the diameter of the section of the pipe to be welded also changes.

7 Claims, 3 Drawing Sheets

INDUCTION WELDING PROCESS FOR VARIABLE DIAMETER PIPES AND DEVICE FOR CARRYING OUT SAID PROCESS

CROSS-REFERENCE TO RELATED APPLICATION

This application claims priority to Spanish Patent Application No. P201630825 filed Jun. 17, 2016, the disclosure of which is hereby incorporated in its entirety by reference.

BACKGROUND OF THE INVENTION

Field of the Invention

The present invention refers to an induction welding process for variable diameter pipes. The invention also refers to the device for carrying out said process. The pipe to be welded can have not only a circular section but also any other geometry. In addition, the pipe may be manufactured in a wide range of materials such as, for example, tin, copper, steel or stainless steel among others, the only requirement being that it is a conductive material for electricity.

It is of particular use in the industry of welding pipes by means of induction.

Description of Related Art

In the current state of the art, welding pipes by means of induction is carried out by rolling a coil, which acts as an inductor, around the outer surface of the pipe and coupling it as close as possible to the surface of the component to be welded. Normally, the coil is rolled around a structure with the same shape as the outer surface of the pipe. An electrical current is sent to the coil, which generates inductive currents in the pipe that manifest fundamentally as two types of currents. One of them is a current that flows radially inside the body of the pipe. The other current flows along the circumference of the body of the pipe and through the mechanical closure that is being welded, known as the weld "vee". In order to weld along the length of the pipe, the structure with the coil moves along the length of the pipe as the welding process takes place.

Of these two currents generated in the pipe, the only useful one for welding the pipe is the one flowing through the weld "vee", while the radial current is directly considered as energy loss. As a result, the higher this current is, the lower the efficiency of the system.

Therefore, it is common knowledge in the sector that a priority upon carrying out the induction welding procedure is to have said inductive current reduced to a minimum. This is done by increasing the impedance of the pipe, which normally is carried out by incorporating a block for concentrating the field inside the pipe, commonly known as an "impeder".

The document ES-0479528_A1 discloses the object of an invention that is an induction welding facility for manufacturing pipes. The invention is applied mainly to stainless steel pipes, but it is also useful for welding other metal pipes at the facility, according to the invention. The induction welding facility for manufacturing pipes comprises an induction coil surrounding a main piece of the pipe, with the edges thereof defining an opening that narrows downstream, a series of forging rollers located downstream of the induction coil, which apply one against the other the heated edges of the main piece or pipe at the welding point located near a plane that connects the axes of the forging rollers, and an internal concentrator placed inside the main piece or pipe, with a series of piled magnetisable plates arranged in parallel to the diameter of the pipe, that passes through the opening of the main piece, and which is longer than the distance between the upstream end of the induction coil and the axes of the forging rollers.

However, the technique of induction welding can be applied when the coupling between the inductor and the pipe is optimal, that is, when the distance between both elements is very small, resulting in maximum induced current in the pipe. As the distance between the inductor and the pipe increases, efficiency decreases exponentially, to the point when the current inducted in the pipe is reduced to a level where no welding takes place.

Due to this effect, using this method for welding variable diameter pipes presents a series of important problems, and as a result it is an uncommon practice. The reason is that welding is optimal in the areas of the pipe that have a larger diameter, but as the inductor moves along the length of the pipe to areas of smaller diameter, the coupling is reduced, increasing the distance between the inductor and the pipe and decreasing the value of the induced current or, in other words, the efficiency of the welding process, until it reaches a point in which the value of the induced current has decreased so much that no welding takes place.

The present invention solves this problem, which is not solved in the current state of the art, by using a system of multiple inductors capable of creating an induced current in the pipe of a constant value in spite of the pipe having a variable section.

SUMMARY OF THE INVENTION

The present invention describes an induction welding device for variable diameter pipes. The device comprises at least two inductors, though they are preferably three, an oscillator connected to each inductor, and a mechanical system connected to each inductor.

It is important that the inductors are placed in symmetry in relation to the axial axis of the pipe to be welded, that is, radially.

In order to ensure the contact between the inductors and the pipe, one of the features of the device is the geometric configuration of the inductors. In this way, a transversal section of an inductor comprises an area with a smaller diameter, an area with a bigger diameter, and an intermediate area, as a cam.

Other features of the device that ensure the contact between the inductors and the pipe include a mechanical system connected to each of the inductors, which is formed by, for example, springs or tensors, that exert a tension on the inductors that forces them to make contact with the pipe in the corresponding area in relation to the diameter of the pipe in each position.

One of the requirements of the inductors is that they are connected to the same electric generator, so that the currents they generate are in the same phase.

The invention also describes the welding procedure. In this way, the welding process carried out by the device of the invention comprises the following phases, bearing in mind that, initially, each of the inductors are connected to an oscillator and a mechanical system and that all the inductors are connected to the same electric generator:

a) Positioning each of the inductors distributed radially in symmetry around a section of the pipe to be welded.

b) Activating the mechanical system, forcing the inductors to make continuous contact with the pipe.

c) Connecting the electric generator to supply power to the inductors.

d) Moving the pipe to weld it.

In addition, this process may also feature placing an impeder inside the pipe before phase c), and also placing the impeder in close proximity to the area of the pipe to be welded.

BRIEF DESCRIPTION OF THE DRAWINGS

To complete the invention being described, and in order to help understand the characteristics of the invention, according to a preferred embodiment thereof, it is accompanied by a set of drawings in which the figures described below have been represented, for purely illustrative purposes and should not be construed as limiting.

Provided below is a list of the references used in the figures:
1. Pipe.
2. Inductor.
3. Oscillator.
4. Impeder.

DESCRIPTION OF THE INVENTION

As explained above, the main problem of induction welding for making pipes (1) takes place when the section of the pipes (1) to be welded is variable, which, as the diameter decreases causing the coupling between the inductor and the pipe to decrease (1), it causes the induced current to decrease exponentially until it is no longer able to weld at all.

In order to avoid this, the present invention describes a device comprising a plurality of inductors (2) connected to a single generator, so that the phases of the inductors (2) are synchronised.

Figure 1:
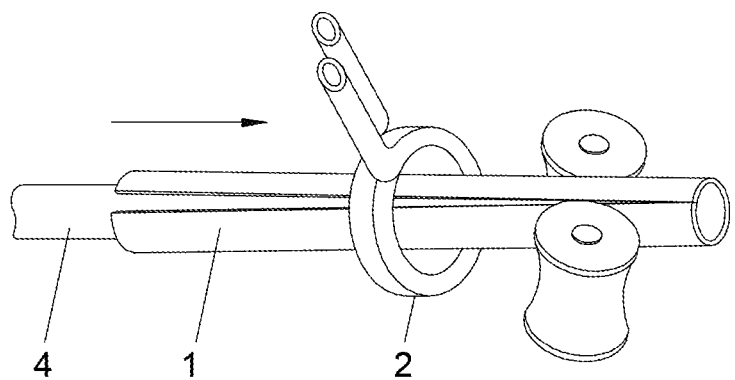
FIG. 1 shows a perspective view of a pipe in the process of being welded according to the traditional method of induction welding.

FIG. 1 shows an example of configuring a pipe (1) about to undergo induction welding according to the current procedures in the state of the art. Plates arrive in the system in order to configure the pipes (1), which are shaped by means of a series of shaping rollers in charge of giving the pipe (1) the final circular configuration thereof. The impeder (4) is placed between the shaping rollers so that it remains inside the pipe (1) as it is being shaped into form. In this system, all the elements remain static in place and the pipe moves along as the welding takes place. In this way, the impeder (4) can be placed according to the needs of the procedure since it has a free area at the end of the pipe (1) where it can be held.

In the present invention, the configuration system may be similar, taking into account that firstly, the diameter of the pipe (1) to be welded is not constant, so the shaping rollers must have a way of changing their position to allow for a variable section, and secondly, the system of the invention is applicable to pipes of any section, including polygonal sections. In any case, the system for configuring the pipe (1) is not part of the object of the invention, so it is not necessary to go into it in any further detail.

In one example of preferred embodiment, a system with three inductors (2) has been represented, and this is considered the most efficient configuration of the system in relation to the number of inductors (2) used. The system may also incorporate only two inductors (2), though the efficiency of the system decreases. By contrast, using more than three inductors (2) creates problems of interferences between the components, and their efficiency does not increase significantly.

Figure 4:
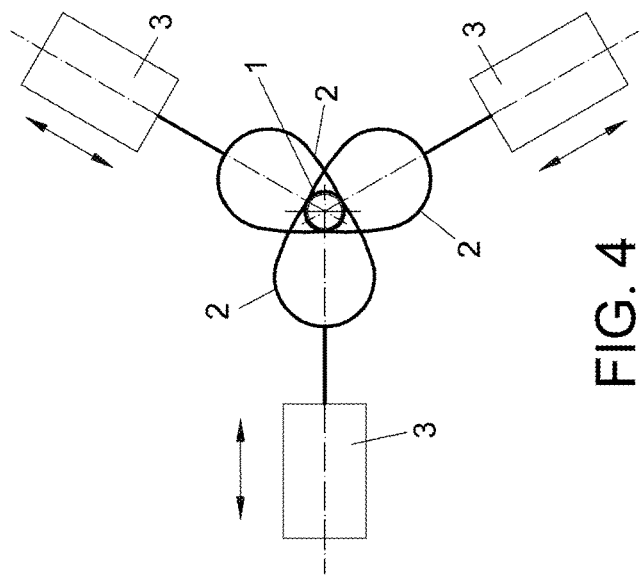
FIG. 4 shows a front view of a pipe in the process of being welded according to the method of induction welding of the present invention, displaying the area of the pipe of a smaller diameter.
Figure 3:
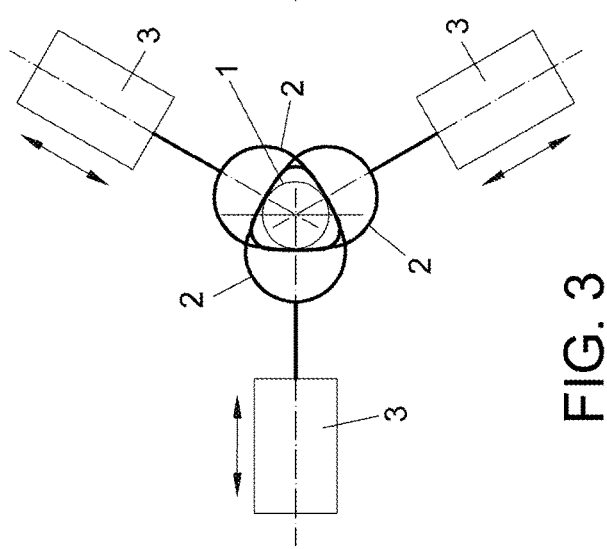
FIG. 3 shows a front view of a pipe in the process of being welded according to the method of induction welding of the present invention, displaying the area of the pipe of intermediate diameter.
Figure 2:
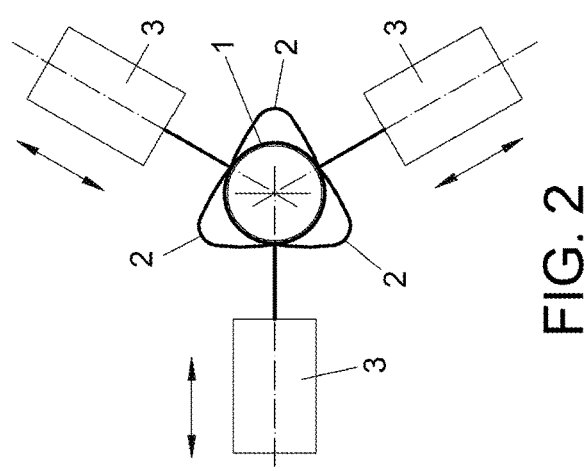
FIG. 2 shows a front view of a pipe in the process of being welded according to the method of induction welding of the present invention, displaying the area of the pipe of a bigger diameter.
Figure 5:
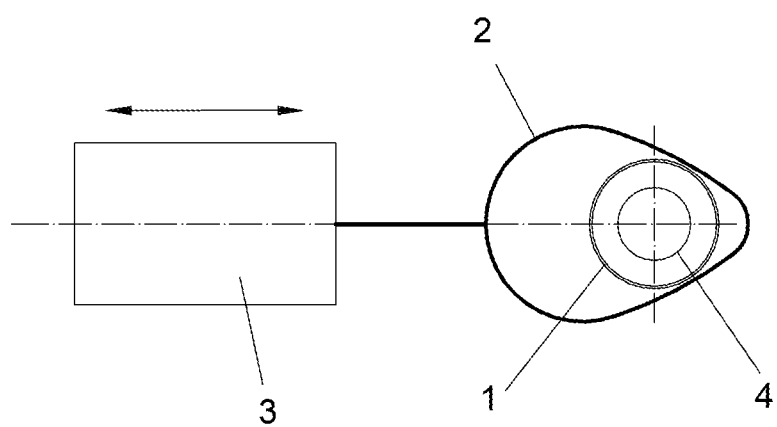
FIG. 5 shows a view of FIG. 3 displaying a single inductor.

As shown in FIGS. 2 to 4, and with greater clarity in FIG. 5, where only one of the inductors (2) has been represented in order to provide greater clarity to how the invention operates, the inductors (2) are configured in a geometry of the shape of a cam incorporating two areas of two different diameters, joined together by a transition arc. These two diameters correspond to the minimum and maximum diameters of the pipe (1) to be welded, which preferably increase with a safety margin that is usually between 5 and 15 mm.

Each of the inductors (2) is equipped with a heating station tasked with adapting the current, so that the inductor (2) is capable of delivering the full power to the pipe (1). The heating station may have different configurations depending on the frequency and power that needs to be delivered. It may incorporate an output transformer, which may be a parallel or series oscillator circuit, etc.

In one of the preferred embodiments, the heating station is an oscillator (3) that can operate in a wide range of frequencies. In any case, the typical values for acceptable welding quality oscillate between 100 and 400 kHz.

Each of the assemblies of inductor (2) and oscillator (3) is linked to a mechanical system capable of moving and positioning the inductor (2) in relation to the pipe (1) depending on the diameter of the pipe (1) in each specific position, so that the coupling between the pipe (1) and the inductor (2) is optimal at all times. The mechanical system has not been represented in the figures and it can be any of the known systems in the state of the art, such as, for example, a system of springs that pull in the radial direction of the inductors (2) with the purpose of forcing the surface of the inductor (2) to make contact with the pipe depending on the diameter of the pipe (1) in each specific position.

FIGS. 2, 3 and 4 show the inductors (2) adapted, respectively, to the area of a pipe (1) with a bigger diameter, an area with intermediate diameter, and an area with a smaller diameter, representing how the inductors (2) adapt to the measurements of the section of the pipe (1) as the welding process moves along the length of the pipe (1) and, therefore, the pipe (1) modifies the section passes to be welded at all times. The impeder (4) has not been shown in these figures since it is not an element that provides any information about how the system is configured. However, the impeder (4) has been represented in FIG. 5, where only one of the inductors (2) is shown, since the simplified figure allows it to be included without affecting the clarity of the drawing.

In one of the preferred embodiments, all the inductors (2) are connected to the same generator, so that they are all in the same phase. If they were connected to independent generators, the currents generated by the inductors (2) would not be in phase, which would significantly affect the performance.

As for the impeder (4), it should be placed as close as possible to the welding area, so that it minimises the radial leakage currents going through the pipe (1). When carrying out a linear welding of a pipe (1), the position of the impeder (4) should not change, but there are situations when welding is not linear, as is the case, for example, of pipes (1) being conformed by means of helicoidal welding.

The invention provides the following advantages in comparison with other systems known in the state of the art:

1. Welding takes place without physical contact between the pipe (1) and the inductor (2). There are welding systems that operate by means of physical contact, which have the drawback of wearing away very fast, and they also involve a very complex set up. Since the transmission takes place by means of contact, the mechanics must be very precise in order to guarantee that there is contact taking place at all times. With the contactless system, the position of the pipe (1) in relation to the inductor (2) may change slightly without affecting the generation of the inducted current and, therefore, without compromising the welding quality.
2. The durability of the inductors (2) is very high in comparison with the process of contact welding, which also requires cleaning the inductors and checking that they have not worn away.
3. Variable diameter pipes can be welded by means of induction, which is not possible using the traditional process of induction welding for making pipes.

Finally, it needs to be considered that the present invention is not limited by the embodiment disclosed herein. Other configurations can be made by persons skilled in the art in light of this description. In consequence, the scope of the invention is defined by the following claims.

The invention claimed is:

1. A device for induction welding of variable diameter pipes, comprising:
    at least two inductors placed in symmetry in relation to an axial axis of the pipe to be welded,
    an oscillator connected to each inductor, and
    a mechanical system connected to each inductor,
    wherein:
    the inductors are configured in such a way that they comprise an area with a smaller diameter, an area with a bigger diameter, and an intermediate area, and
    the mechanical system force each inductor to make contact with the pipe by a corresponding degree in relation to the diameter of the pipe in each position,
    so that the position of the inductors in relation to the pipe changes radially as the diameter of the section of the pipe to be welded also changes.
2. The device for induction welding of variable diameter pipes, according to claim 1, wherein the device comprises three inductors.
3. The device for induction welding of variable diameter pipes, according to claim 1, wherein the inductors are connected to the same generator, so that the currents they generate are in the same phase.
4. The device for induction welding of variable diameter pipes, according to claim 1, wherein the mechanical system comprises a spring forcing the corresponding inductor to make contact with the pipe.
5. An induction welding process for variable diameter pipes, using a device according to claim 1, wherein each of the inductors is connected to an oscillator and to a mechanical system, and each of the inductors is connected to the same electric generator, the process comprising:
    a) Positioning each of the inductors distributed radially in symmetry around a section of the pipe to be welded;
    b) Activating the mechanical system, forcing the inductors to make continuous contact with the pipe;
    c) Connecting the electric generator to supply power to the inductors; and
    d) Moving the pipe in order to weld it.
6. The induction welding process for variable diameter pipes, according to claim 5, wherein an impeder is placed inside the pipe before phase c) takes place.
7. The induction welding process for variable diameter pipes, according to claim 6, wherein the impeder is placed in near proximity to the area of the pipe to be welded.

* * * * *